June 5, 1962 S. B. BROUSE 3,037,534
WIRE-TYING MACHINE
Filed Aug. 11, 1959 6 Sheets-Sheet 1
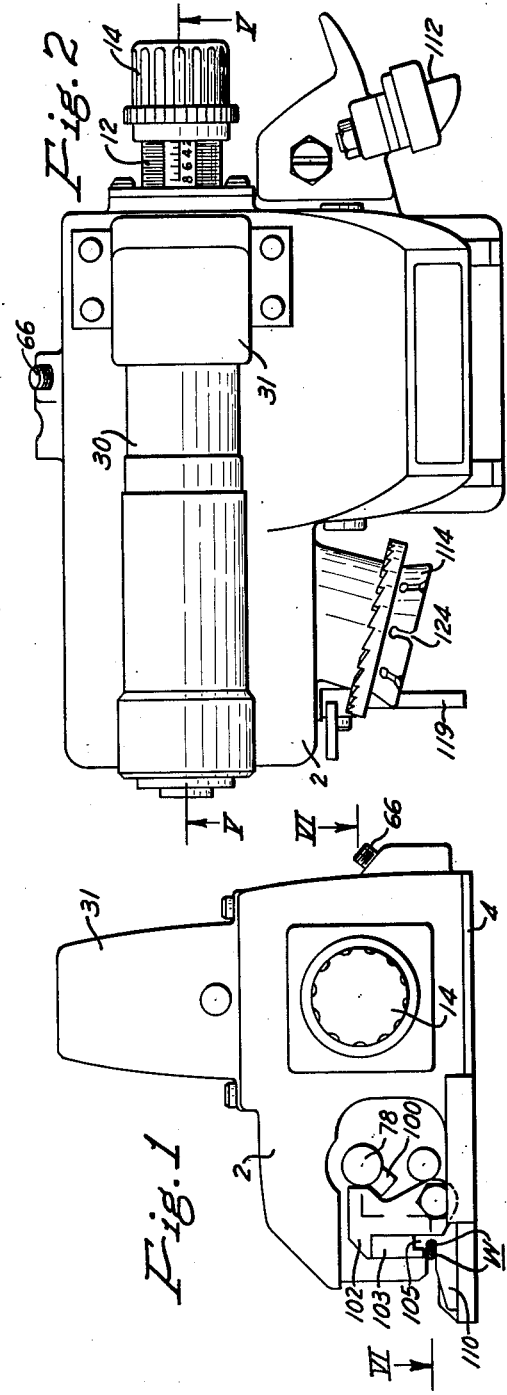
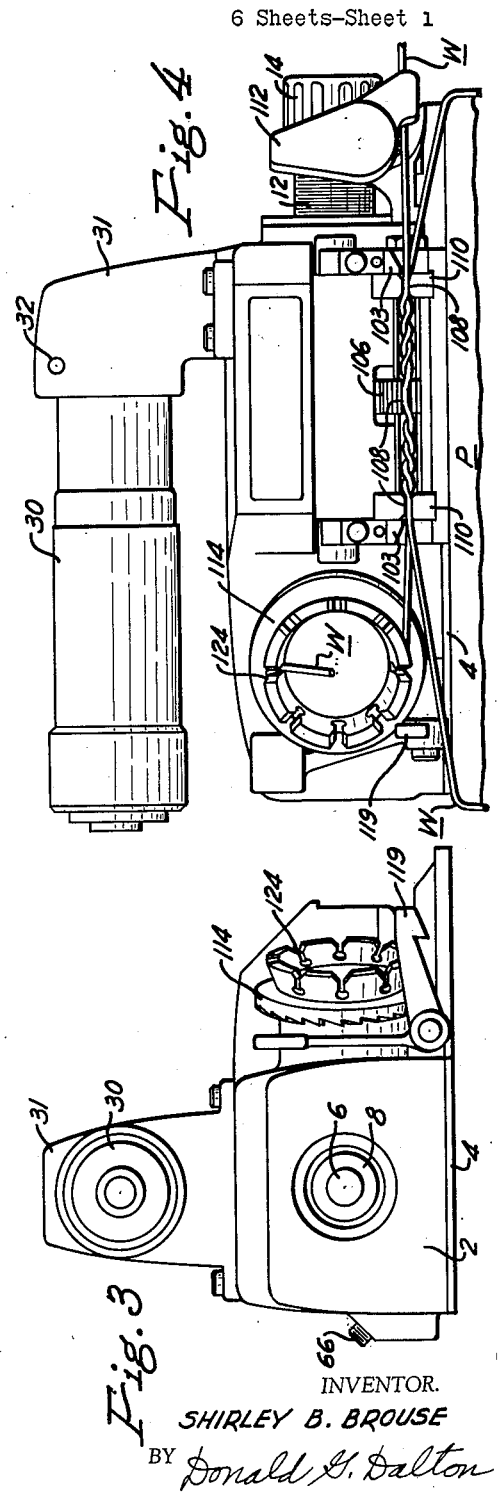
INVENTOR.
SHIRLEY B. BROUSE
BY Donald G. Dalton
ATTORNEY

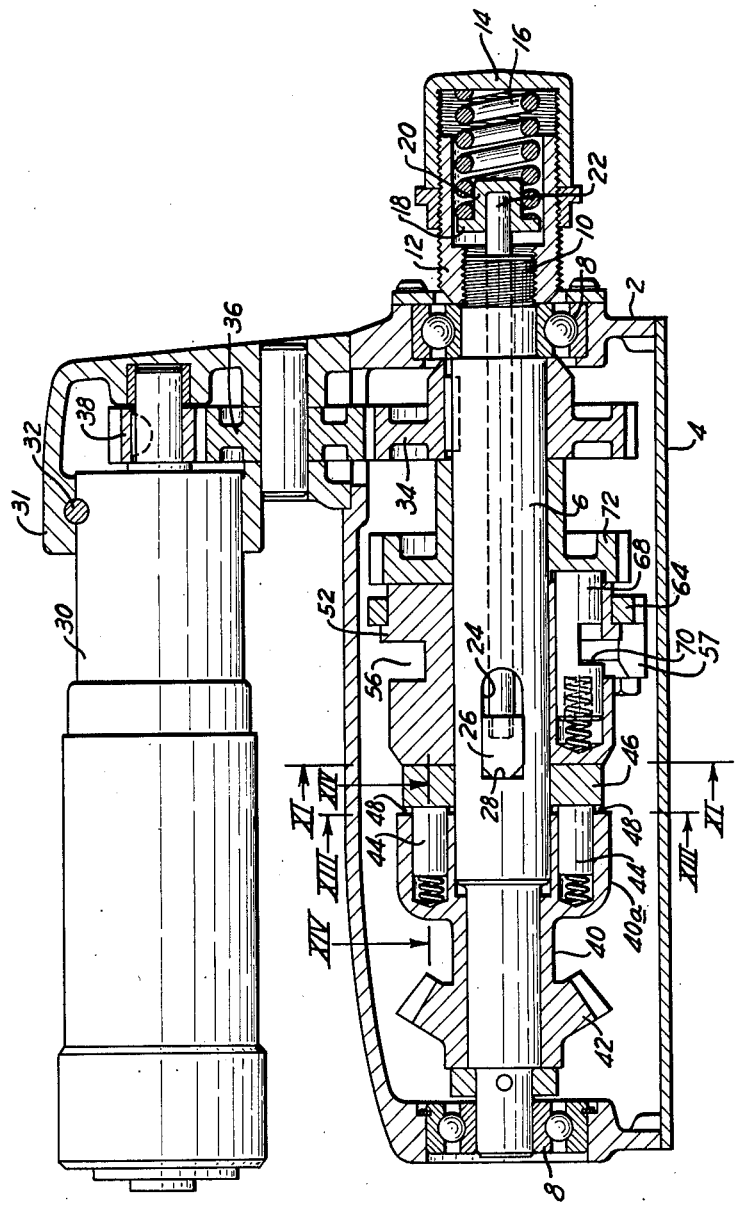

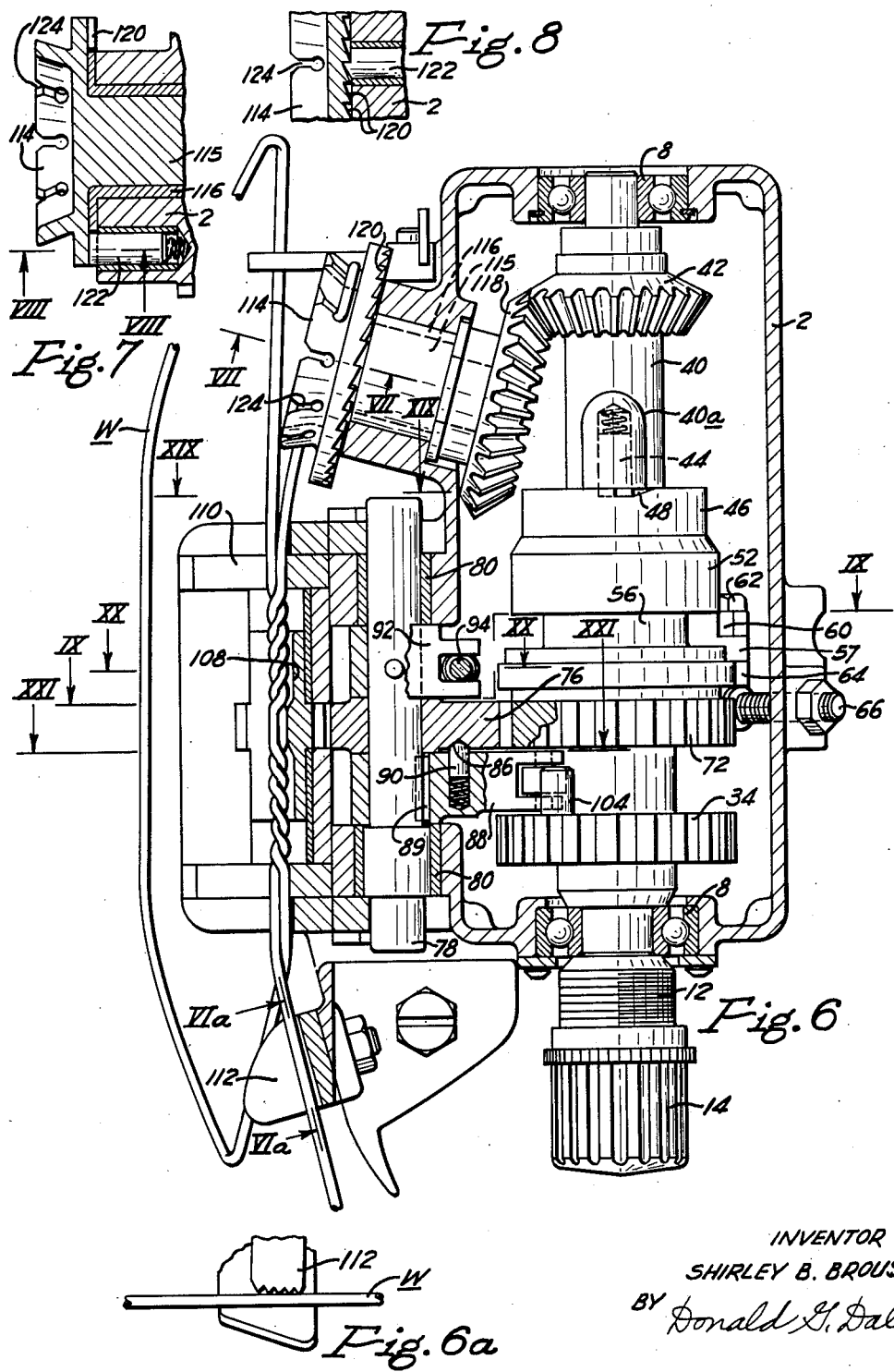

June 5, 1962   S. B. BROUSE   3,037,534
WIRE-TYING MACHINE
Filed Aug. 11, 1959   6 Sheets-Sheet 4

INVENTOR.
SHIRLEY B. BROUSE
BY Donald G. Dalton
ATTORNEY

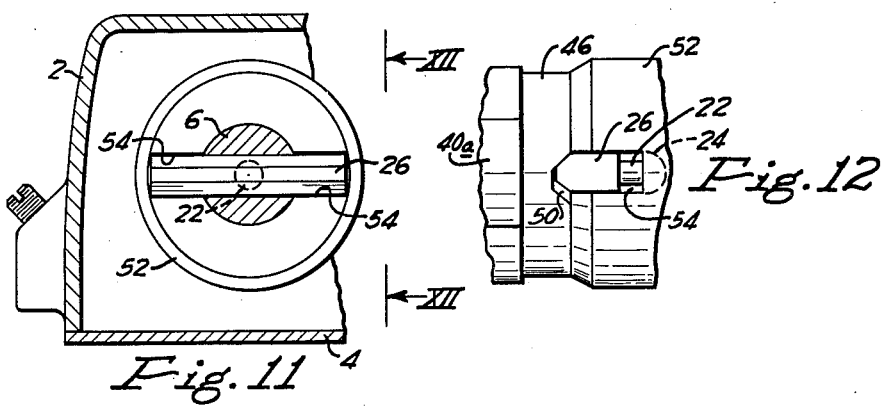
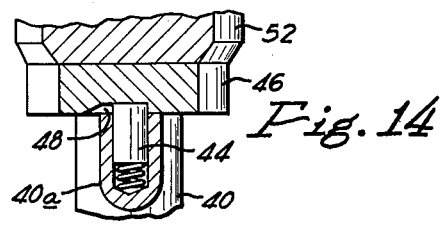
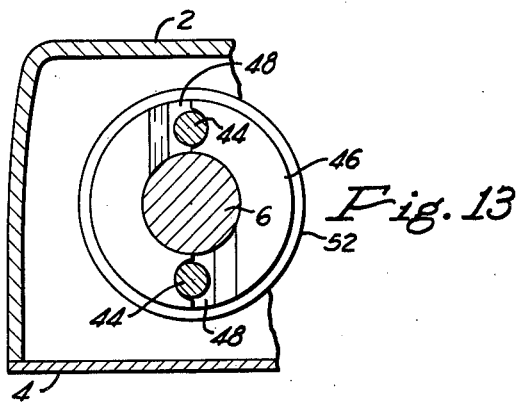

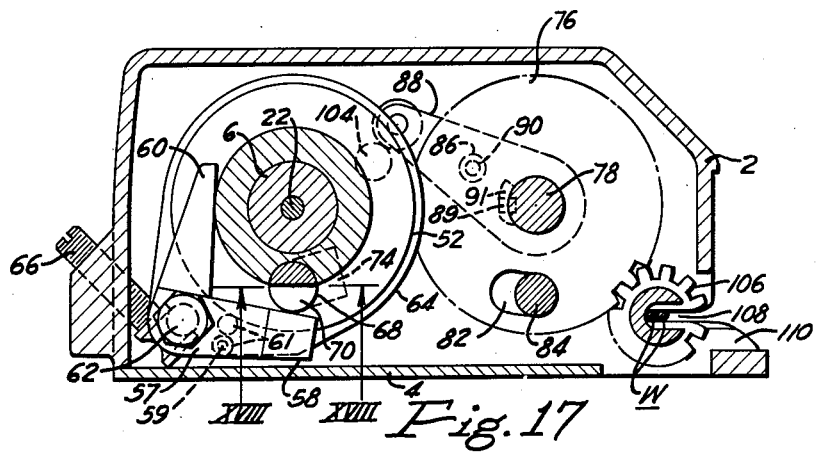

United States Patent Office 3,037,534
Patented June 5, 1962

3,037,534
WIRE-TYING MACHINE
Shirley B. Brouse, Chicago, Ill., assignor to United States Steel Corporation, a corporation of New Jersey
Filed Aug. 11, 1959, Ser. No. 833,003
5 Claims. (Cl. 140—93.6)

The present invention relates generally to wire-tying machines and more particularly to that type of wire-tying machine providing means for tensioning a wire placed around a package or bundle with its ends overlapping, twisting the overlapped portions of the wire into a "knot," and cutting off the excess wire from the ends of the knot.

A primary object of the invention is to provide, in such a machine, a novel power-transmission system whereby the tensioning, twisting and cutting means are power-actuated in proper sequence.

Another object of the invention is to provide a machine of the character indicated in which means are incorporated for varying and controlling the amount of tension imparted to a wire tie before the knot is twisted.

A further object of the invention is to provide a machine of the character indicated in which means are incorporated whereby the twisting cycle is completed before the cutting cycle is initiated.

My invention, as shown in the accompanying drawings, comprises generally a main shaft driven by a reversible motor. A tension head is driven through a slip clutch on rotation of the shaft in one direction. A knotter or twister pinion is driven through a single-revolution clutch on rotation of the shaft in the other direction. Wire cutters are operated by an auxiliary or rocker shaft on completion of the twisting operation. The rocker shaft is actuated through a rocker arm thereon by the power transmission system between the motor and main shaft and I provide means for preventing such actuation until after the desired number of rotations of the twister pinion have been effected. In the drawings:

FIGURE 1 is an end view of the apparatus of the invention with the gripper assembly removed looking at the right end of FIGURE 4;

FIGURE 2 is a plan view;

FIGURE 3 is an end view of the apparatus of the invention looking at the end thereof opposite to that shown in FIGURE 1;

FIGURE 4 is a front elevational view;

FIGURE 5 is a sectional view with a part in elevation taken along the line V—V of FIGURE 2;

FIGURE 6 is a sectional view taken along the line VI—VI of FIGURE 1 with gripper assembly in place;

FIGURE 6a is a view taken along line VIa—VIa of FIGURE 6;

FIGURE 7 is a partial sectional view taken along the line VII—VII of FIGURE 6;

FIGURE 8 is a sectional view taken along the line VIII—VIII of FGURE 7;

FIGURE 11 is a cross-sectional view taken along the line XI—XI of FIGURE 5;

FIGURE 12 is a partial elevational view taken along the line XII—XII of FIGURE 11;

FIGURE 13 is a cross-sectional view taken along the line XIII—XIII of FIGURE 5;

FIGURE 14 is a partial sectional view taken along the line XIV—XIV of FIGURE 5;

FIGURE 17 is a view similar to FIGURE 9 but showing the parts in position during the tensioning cycle;

FIGURE 18 is a partial sectional view taken along the line XVIII—XVIII of FIGURE 17;

FIGURE 19 is an end view taken along line XIX—XIX of FIGURE 6 showing parts in wire-cutting position after the knot has been formed;

FIGURE 20 is a sectional view taken along the line XX—XX of FIGURE 6 showing parts in rocked position for cutting wire after the knot is formed; and FIGURE 21 is a sectional view taken along the line XXI—XXI of FIGURE 6 showing parts in position for cutting the wire after the knot is formed.

Figure 9:
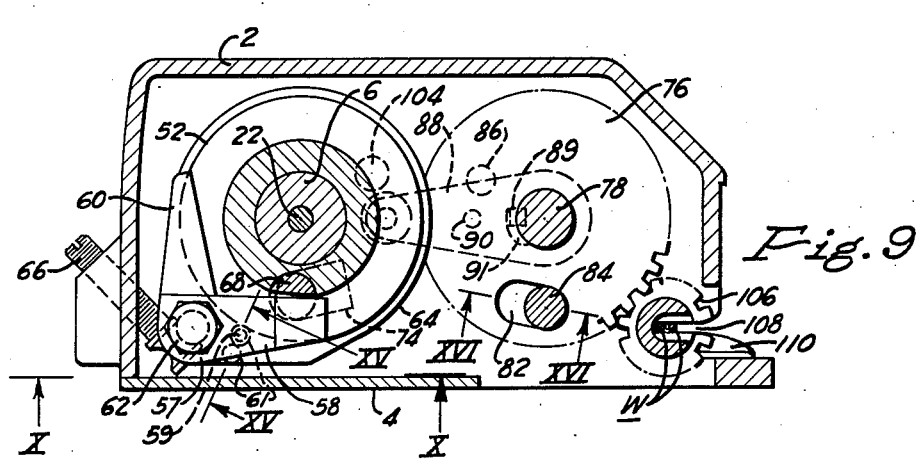
FIGURE 9 is a cross-sectional view taken along the line IX—IX of FIGURE 6.

Referring more particularly to the drawings, a housing 2, preferably a casting, is detachably mounted on a flat base plate 4. A main power shaft 6 is journaled in ball bearings 8 in the housing 2, with one end 10 thereof projecting outwardly of the housing. A sleeve 12 is threaded on and extends beyond the projecting portion of the shaft 6 and has screwed thereon a cap 14 for confining a helical compression spring 16. Spring 16 bears against the inside end surface of the cap 14 at one end and against a flange portion 18 of an inner cap 20 which is disposed within the sleeve 12 and the cap 14. As shown in FIGURE 5, the main body of the inner cap 20 is surrounded by the spring 16.

A slide thrust rod 22 extends through an axial hole in the shaft 6 which communicates with a transverse slot 24 in the shaft intermediates its ends. One end of the rod 22 is enclosed in the inner cap 20 while its opposite end is fitted into a pocket intermediate the ends of an elongated transversely extending key 26 which is slidably mounted for axial movement relative to the shaft 6 within the transverse slot 24. Spring 16 constantly urges the rod 22 axially of the shaft 6 so that the key 26 is constantly urged against the forward wall 28 of the keyway 24. The ends of the key 26 project radially and outwardly of the shaft 6. The amount of pressure exerted by the key 26 against wall 28 is controlled by the force of spring 16 which can be varied by threadingly adjusting the cap 14 along the sleeve 12.

The shaft 6 is driven by a reversible motor 30 which may be electrically, hydraulically, pneumatically, or otherwise suitably powered as desired. The motor also serves as a handle for the machine. The motor 30 is mounted above the housing 2 by means of an upright motor mount casting 31 which is bolted at its bottom to the housing 2. The motor is secured to the motor mount casting by means of a pin 32.

The shaft 6 is connected with motor 30 by means of a gear 34 keyed on shaft 6 and an intermediate idler gear 36 which is in mesh with a gear 38 keyed on the power shaft of the motor 30.

A sleeve 40 having a tensioning gear 42 fixed on one end thereof is rotatably mounted on the end of shaft 6 remote from its projecting portion 10. The end of the sleeve 40 opposite the gear 42 is formed with an enlarged outside hub 40a for the purpose of carrying a pair of spring-biased connecting pins 44. These pins extend parallel with the shaft 6 and normally project outwardly of the hub 40a of the sleeve 40 in the direction toward the gear 34.

A clutch plate or collar 46 is loosely mounted for rotation on the shaft 6 adjacent the hub 40a of the sleeve 40. The face of the collar 46 toward the sleeve 40 is provided with a pair of spaced depressions 48 for receiving the projecting ends of the pins 44. One side of each of the depressions 48 is inclined while the other side is straight, as best shown in FIGURES 13 and 14, for a purpose which will become apparent.

The side of the collar 46 remote from the sleeve 40 is formed with a pair of diametrically opposed depressions 50 adapted to receive the ends of the key 26 which project radially from the shaft 6. Both sides of each of the depressions 50 are inclined to facilitate ingress and egress of the key 26 as will be more fully explained. A hub 52 is loose on the shaft 6 adjacent the collar 46. The projecting ends of the key 26 pass through radial slots 54 in the hub 52, as shown in FIGURES 11 and 12, to thereby key the hub to the shaft 6 for rotation therewith. The key 26 projects radially outwardly of the slots 54 of the hub 52 to mate with the depressions 50 in the collar 46. This constitutes a unidirectional slip clutch for driving gear 42 on rotation of shaft 6 in one direction.

A pawl 57 having two arms 58 and 60 is pivotally mounted on a pivot pin 62 carried by a ring 64 which surrounds the hub 52. A peripheral groove 56 is formed in the latter intermediate its ends for selectively receiving lever arms 58 and 60. The ring 64 is adjustably fastened to the housing 2 by means of a stud 66, the lower end of which is connected with pivot pin 62, as shown in FIGURES 9 and 17. The pawl 57 is circumferentially adjustable relative to the clutch by means of stud 66. The arms 58 and 60 of the pawl 57 are approximately at right angles so that when the pawl is pivoted to position one arm within the groove 56 the other arm is removed from the groove for a purpose which will become apparent. The arm 58 of the pawl is provided with a spring-loaded detent 59 which engages one or the other of two depressions 61 in the ring 64 to releasably hold the pawl in either of its two positions (see FIGURES 9 and 17).

The hub 52 carries a spring-biased pin 68 which is constantly urged outwardly of the hub face remote from the collar 46 in a plane parallel with the shaft 6. Pin 68 spans the groove 56 and is formed with a slot 70 intermediate its length which is adapted to mate with the groove 56, as shown in FIGURES 5, 9, 10 and 18.

A gear 72 is mounted loosely on the shaft 6 adjacent the hub 52. A pocket 74 having one inclined side and one straight side is formed in the side of the gear 72 toward the hub 52 adapted to receive the projecting end of the pin 68 and be rotated thereby when the clutch is rotated in one direction. The parts just described constitute a single-revolution clutch.

Figure 16:
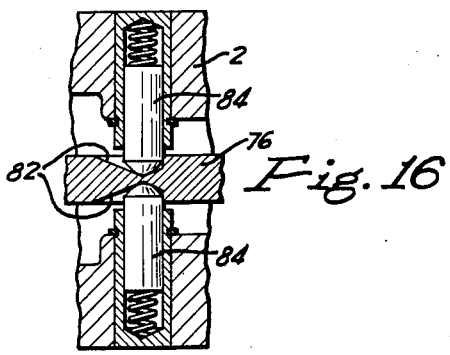
FIGURE 16 is a partial sectional view taken along the line XVI—XVI of FIGURE 9.

The gear 72 is in meshing engagement with an intermediate gear 76 of the same size as gear 72. Intermediate gear 76 is loose on an auxiliary shaft 78 journaled in bearings 80 supported in the housing 2. Depressions 82 are formed in opposite sides of the intermediate gear 76 for receiving spring-loaded detents 84 disposed in bushings in housing 2, as shown in FIGURE 16. A second depression 86 is formed in one side of the intermediate gear for a purpose which will become apparent (see FIGURES 6 and 9).

A rocker arm 88 is keyed to the shaft 78 by means of a key 89, adjacent one side of the intermediate gear 76. The key 89 projects from the periphery of the shaft 78 and extends into a slot 91 formed in the rocker arm 88. Slot 91 provides a lost-motion connection which permits the arm 88 to rotate freely about the shaft 78 within the range of travel of the key 89 in the slot 91. Rocker arm 88 carries a spring-loaded detent 90 which is adapted to be received in the detent pocket 86, as shown in FIGURES 6 and 9.

A forked lever arm 92 is pinned to the shaft 78 for rotation therewith adjacent the side of the gear 76 remote from the rocker arm 88. The forked end of lever arm 92 embraces a rod 94 which is vertically disposed in the housing 2 and has a helical spring 96 mounted thereround. Spring 96 bears against a collar 98 on rod 94 at its lower end and against the lever arm 92 at its upper end to thereby bias lever arm 92 constantly upwardly, as shown in FIGURE 20.

As shown in FIGURES 1 and 19, the ends of the shaft 78 project outwardly from the housing 2 and carry cutter holder cams 100 theron which are adapted to operate cutter holders 102 as hereinafter described.

A pin 104 projects from the side of the gear 34 toward the gear 72 in the path of the rocker arm 88 as shown in FIGURES 6, 17 and 21, for a purpose which will become apparent.

A twister pinion 106 having a wire-receiving slot 108 extending along the length thereof is journaled in the lower part of the housing 2 in mesh with the intermediate gear 76. A yoke 110 is disposed adjacent each end of the twister pinion. A cutter holder 102 is positioned adjacent each yoke 110 and includes a cutter 103 which cooperates with the lower arm of the yoke to shear the wire as will be more fully described hereinafter.

A gripper 112 is mounted on one side of the housing 2 adjacent to and spaced from one of the yokes 110 for gripping one end of a wire and holding it while the tie is being made.

A tension drum or head 114 is mounted on the side of the housing 2 opposite the gripper 112 with its shaft 115 journaled in a bushing 116. A bevel gear 118 is affixed to the inner end of shaft 115 within the housing 2 and meshes with tension gear 42 of the sleeve 40.

The underside of the head of the tension drum 114 has ratchet teeth 120 therein which cooperate with a spring-biased pawl 122 to prevent rotation of the drum in one direction. In operation, to apply a wire tie around a package P, as shown in FIGURE 4, the machine is placed on the package with the base 4 resting thereagainst and one end of a coil of wire W is hooked into one of the slots 124 of the tension drum 114. The wire portion leading from the tension drum 114 is then inserted sidewise into the slot 108 of the twister pinion and the yokes 110. After this has been done, the wire is passed around the package and again inserted into the slot 108 and holding yokes 110, thereby placing portions of the wire in side-by-side relationship in the twister pinion slot and the holding yokes, as shown in FIGURES 6 and 9. A hook 119 is pivotally mounted on the housing 2 subjacent the tension drum 114 for engaging the wire to prevent it from moving out of the twister pinion and the yokes. The end of the wire length leading back to the coil is then inserted into the gripper 112 and clamped therein. The gripper 112 may be of any type desired whereby the wire may be securely clamped.

The motor 30 is then operated to rotate the drive shaft 6 in counterclockwise direction as viewed in FIGURE 9. Rotation of shaft 6 causes like rotation of the hub 52 which is keyed to the shaft by means of the key 26. At the same time the projecting ends of the key 26 rotate the collar 46. Rotation of collar 46 is transmitted to sleeve 40 through the connecting pins 44 which are engaged by the straight sides of the depressions 48 in one side of the collar 46, as shown in FIGURES 5, 6 and 14. Rotation of sleeve 40 and the gear 42 which is integral therewith causes rotation of the tension drum 114 to draw the wire W taut around the package.

When the wire around the package achieves a predetermined degree of tautness, the amount of force necessary to rotate tension drum 114 further becomes greater than the force exterted by spring 16 on the rod 22. The force exerted by spring 16 is then insufficient to maintain the projecting ends of the key 26 within the depressions 50, as shown in FIGURES 5, 11 and 12, so that continued rotation of shaft 6 and hub 52 after the wire has achieved the predetermined degree of tautness merely causes the projecting ends of key 26 to ride out of the depressions 50 along the inclined sides thereof and slip so that sleeve 40 is no longer rotated. The tension of spring 16, which has been previously adjusted as explained hereinbefore, thus determines the degree of tautness to be achieved by the wire W before the tension drum stops rotating. After the sleeve 40 thus stops rotating, the pawl 122 in engagement with the ratchet 120, as shown in FIGURES 7 and 8, holds the tension drum stationary so that the attained tautness in the wire W is maintained during the subsequent knot-forming and cutting operations.

During the tensioning cycle just described, gear 72 and intermediate gear 76 are held stationary by means of the detent pins 84 which are seated in the depressions 82 in both sides of the intermediate gear 76, as shown in FIGURE 16. While hub 52 is rotating during the tensioning cycle, pin 68 travels out of pocket 74 along the inclined surface thereof and rides along the side of the gear 72 so that the gear is not rotated during the tensioning cycle. Any tendency for the gear 72 to be rotated by pressure of the pin 68 on its face is resisted by the detent pins 84. At the start of the tensioning cycle the arm 58 of pawl 57 is positioned in the groove 56 of the hub 52 and arm 60 is out of the groove, as best shown in FIGURE 9. As the hub 52 makes its first revolution during the tensioning cycle pin 68 strikes arm 58 and pivots pawl 57 so that arm 60 is positioned within the groove 56 and arm 58 is outside the groove, as best shown in FIGURE 17. When pawl 57 is thus pivoted detent 59 on the arm 58 enters the lowermost of the two depressions 61 on the ring 64 to maintain the pawl in this position. During subsequent revolutions of the hub, pin 68 passes by arm 60 of the pawl. The reason that the pin 68 passes by arm 60 is that with shaft 6 and thub 52 revolving in a counter-clockwise direction, as viewed in FIGURE 17, and the tip of pin 68 riding on the side of gear 72 and not seated in pocket 74 of gear 72, groove 70 of pin 68 is positioned so that pin 68 will pass by arm 60 without interference. Since arm 58 is now removed from the groove 56 it cannot engage pin 68 as the hub is rotated.

To form the knot, motor 30 is reversed to rotate shaft 6 in clockwise direction as viewed in FIGURE 9. Clockwise rotation of shaft 6 causes like rotation of hub 52 by means of key 26. During the clockwise rotation of hub 52 the pin 68 enters the pocket 74 in one side of gear 72 and bears against the straight side thereof to effect rotation of the gear, as shown in FIGURES 17 and 18. During the first revolution of gear 72 pin 68 strikes arm 60 of pawl 57 to pivot arm 58 into the peripheral groove 56. The reason for this is that during the twisting cycle, shaft 6 and hub 52 are revolving in a clockwise direction, the tip of pin 68 is seated in pocket 74 of gear 72 and groove 70 of pin 68 is now positioned so that the pin 68 strikes the arm 60 of pawl 57.

At the start of the tensioning cycle shaft 6 and hub 52 is revolving in a counter-clockwise direction, as viewed in FIGURE 17, arm 58 of pawl 57 is within the groove 56 of hub 52 and the tip of pin 68 is either riding on the side of gear 72 or dropping into pocket 74 of gear 72 and the ungrooved portion of pin 68 extends into the groove 56 of hub 52. Inasmuch as the major thickness of arm 58 of pawl 57, unlike arm 60 is about equal to the width of the groove 56 of hub 52, as pin 68 approaches arm 58 pin 68 will strike arm 58 to move it out of the groove 56 of hub 52. On the other hand, near the end of the twisting cycle with shaft 6 and hub 52 revolving in a clockwise direction, as viewed in FIGURE 17, pin 68 does not force arm 58 out of the groove 56 of hub 52 but the tapered portion of the groove 70 of pin 68 engages the tapered portion of arm 58 (see FIGURE 10) and with continued rotation of hub 52 the tip of pin 68 is pulled free from pocket 74 of gear 72 by camming action.

It will be noted that pin 68 is slidable but not revolvable with respect to hub 52. This results from the use of a pin (not shown) which engages a flattened portion on the circumference of pin 68. This arrangement causes groove 70 of pin 68 to be maintained in correct radial position at all times.

Figure 10:
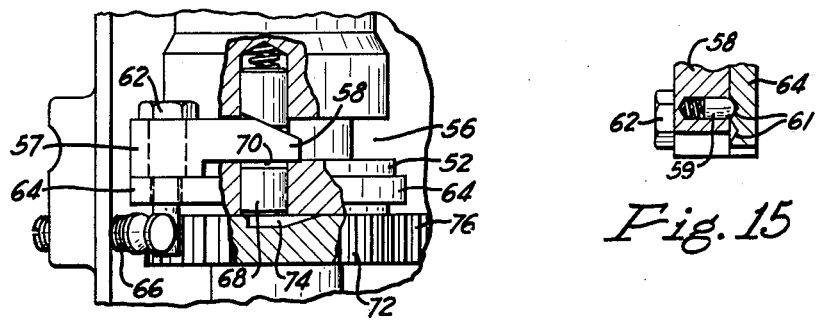
FIGURE 10 is a partial bottom plan view with parts cut away for clarity taken along the line X—X of FIGURE 9.
Figure 15:
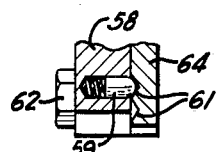
FIGURE 15 is a partial sectional view taken along the line XV—XV of FIGURE 9.

Continued rotation of hub 52 after one revolution beyond the starting point causes the arm 58 to engage the side of the slot 70 of the pin 68 so the pin moves out of the pocket 74 thereby disengaging it from contact with the gear 72, as shown in FIGURE 10. This causes gear 72 to stop rotating. During the rotation of gear 72, brought about by the one revolution of hub 52, twister pinion 106 is rotated through intermediate gear 76 so that the side-by-side portions of wire W in the twister pinion slot are twisted and the knot is formed. The ratio of the twister pinion and the intermediate gear 76 may be varied by substituting a different size twister pinion or gears 72 and 76 if desired to provide more or less twists in forming the knot to impart desired strength thereto. In forming the knot, the wires are actually twisted slightly beyond the required number of twists so that the excess torsion set up in the wire during twisting is relieved after the knot is formed and the twister pinion returns to position with the slot 108 in ejecting position. Thus relieving the torsion permits the completed knot to be easily ejected from the twister pinion and the yokes. The overtwist is formed during the rotation of hub 52 slightly beyond one revolution and before the arm 58 of pawl 57 has disengaged the pin 68 from gear 72. The amount of overtwist can be varied by turning stud 66 to move the ring 64 and pawl 57 circumferentially relative to the hub 52 so that arm 58 disengages pin 68 from gear 72 sooner or later after one revolution of hub 52.

Return of the twister pinion to proper ejecting position after the knot with overtwist has been formed is brought about by free rotation of the intermediate gear 76 after pin 68 is disengaged from gear 72 until detent pins 84 enter depressions 82, as shown in FIGURE 16. The latter are so disposed relative to the circumference of the intermediate gear 76 that they are in position adjacent to the dent pins 84 and adapted to be engaged thereby when the twister pinion is in proper ejecting position. If desired, the position of arm 58 can be adjusted so that gear 72 will rotate only one revolution when hub 52 rotates one revolution so that no overtwisting is done.

Prior to initiation of the twisting cycle, pin 104 is normally disposed under the free end of rocker arm 88. This relative positioning of the pin 104 and arm 88 is brought about by the relative positions of the pin 104 on the gear 34 and the pin 68 in hub 52. In other words, pin 68 does not engage gear 72 until pin 104 is in position under the free end of rocker arm 88, as shown in FIGURE 17. These relative positions are effected when the tool is assembled and never vary since both the gear 34 and hub 52 are keyed to shaft 6.

When the twisting cycle is started the rotation of gear 76 causes the rocker arm 88 which is normally in up-tilted position to move back to horizontal position due to the engagement of gear 76 by detent pin 90. Movement of the rocker arm below horizontal position is prevented by the key 89 of shaft 78 which abuts the upper end of slot 91 in rocker arm 88 when the rocker arm is in horizontal position. Shaft 78 is held stationary by the pressure of the helical spring 96 bearing upwardly against the lever arm 92, as shown in FIGURE 20.

As the twisting cycle is completed, rotation of gear 34 causes the pin 104 to approach the rocker arm 88 in horizontal position. After the knot has been formed continued rotation of gear 34 causes the pin 104 to strike arm 88 and tilt it downwardly, as shown in FIGURE 21. During the downward movement of arm 88 the key 89, which is in engagement with the end of slot 91, causes shaft 78 to be rocked. When shaft 78 is rocked, spring 96 is compressed by lever arm 92 (see FIGURE 20) and the cams 100 on the ends of shaft 78 engage the cutter holders 102 and pivot them downwardly to cut the wire W against the lower arm of the yokes 110 at each end of the knot, as shown in FIGURE 19.

The cutting edges of left and right-hand cutters 103 are disposed out of horizontal alignment so that the end of the wire W leading to the tension drum, which is the innermost of the wire portions in the yokes 110, is cut by one cutter and the outermost wire portion which leads to the gripper and wire coil is cut by the other cutter (see FIGURES 1 and 19). A vertical slot 105 (see FIGURE 1) is provided in the cutter at the right-hand end of the machine for by-passing the innermost wire portion when the cutters are actuated.

After the cutting operation has been completed, the force of spring 96 on lever arm 92 causes cutter holders 102 and shaft 78 to return to normal position. This action also causes rocker arm 88 to return to normal uptilted position. When shaft 78 returns to its normal position after the wire has been cut and rocker arm 88 is carried back toward a horizontal position by key 89, the inertia of the snappy return action carries rocker arm 88 past the horizontal position into its normal uptilted position. With the rocker arm 88 in uptilted position, if the machine is actuated to cause the twisting cycle to go on longer than necessary to complete the twisting of the knot, pin 104 on gear 34, when it comes around again, will clear the end of rocker arm 88 so that the cutting cycle will not be repeated. Rocker arm 88 is maintained in the uptilted position by means of the spring-loaded pin detent 90, which is carried by the arm 88, engaging the depression 86 on the side of gear 76, as shown in FIGURES 6 and 17.

After the cutting operation, cutter holders 102 are restored to raised position by helical springs 130 so that the completed knot can be ejected from the tool and wire can be threaded through the tool for a subsequent operation.

It will be noted that the twisting cycle is fully completed before the cutting operation starts so that the cut ends of the wire are not spread away from the other wire at each end of the knot and the knot is not weakened. The means bringing this about are best shown in FIGURES 9 and 21. Referring now to FIGURE 9, all parts are shown in the positions they are in at the end of the twisting cycle. Pin 104 in gear 34 is shown just prior to making contact with the end of rocker arm 88. When the pin 104 makes contact with the rocker arm the rocker arm is moved by pin 104 into the position shown in FIGURE 21, at which time the wire is cut as described above.

While one embodiment of my invention has been shown and described it will be apparent that other adaptations and modifications may be made without departing from the scope of the following claims.

I claim:

1. A transmission for a wire-tying machine of the type having a housing, a reversible motor mounted on said housing, a twister pinion journaled in said housing, a cutter pivoted on the housing adjacent each end of said pinion, a main shaft journaled in said housing parallel with the axis of said pinion, and drive means connecting said motor to said shaft, said transmission comprising a twister gear loose on said shaft for driving said pinion, an auxiliary shaft journaled in said housing parallel with said main shaft, an intermediate gear loose on said auxiliary shaft and meshing with said twister gear and said pinion, said intermediate gear having a recess in one side with a cam surface, a spring-urged pin slidable in said housing adapted to engage said cam surface, means including a single-revolution clutch effective on rotation of said main shaft in one direction only to drive said twister gear, said clutch including a hub disposed on and rotatable with said main shaft, a pin slidable axially in said hub engageable with said twister gear on rotation of said hub in said one direction, a pawl pivotally mounted adjacent said hub adapted to move said last named pin out of engagement with said gear after one complete revolution thereof, and means for adjusting the pivotal mounting of said pawl generally circumferentially of said hub.

2. A transmission as defined by claim 1 including cam means on said auxiliary shaft effective to operate said cutters, respectively, and a rocker arm mounted on said auxiliary shaft so as to impart limited angular movement thereto, and means effective to actuate said arm.

3. A transmission as defined by claim 2 including a lost-motion connection between said arm and said auxiliary shaft whereby said arm may be turned to a position out of the way of said arm-actuating means without rotation of said auxiliary shaft.

4. A transmission as defined by claim 3 including means releasably holding said arm in said out-of-the-way position.

5. A transmission as defined by claim 2 including spring-return means cooperating with said auxiliary shaft effective to restore said arm to normal position after cutter-operating movement thereof.

References Cited in the file of this patent

UNITED STATES PATENTS

| | | |
|---|---|---|
| 1,305,461 | Gooding | June 3, 1919 |
| 1,669,048 | Gerrard | May 8, 1928 |
| 2,506,452 | Havir | May 2, 1950 |
| 2,929,608 | Zippel | Mar. 22, 1960 |